(12) United States Patent
Argaud et al.

(10) Patent No.: US 8,029,238 B2
(45) Date of Patent: Oct. 4, 2011

(54) SYSTEM FOR COOLING A DOWNSTREAM CAVITY OF A CENTRIFUGAL COMPRESSOR IMPELLER

(75) Inventors: Thierry Argaud, Chartrettes (FR); Antoine Robert Alain Brunet, Moissy Cramayel (FR); Jean-Christophe Leininger, Paris (FR)

(73) Assignee: SNECMA, Paris (FR)

( * ) Notice: Subject to any disclaimer, the term of this patent is extended or adjusted under 35 U.S.C. 154(b) by 1112 days.

(21) Appl. No.: 11/779,000

(22) Filed: Jul. 17, 2007

(65) Prior Publication Data
US 2008/0019829 A1  Jan. 24, 2008

(30) Foreign Application Priority Data
Jul. 19, 2006 (FR) ..................... 06 06538

(51) Int. Cl.
*F01D 1/02* (2006.01)
(52) U.S. Cl. ............ 415/211.1; 60/785; 60/39.08
(58) Field of Classification Search ............ 415/115, 415/108; 60/39.75, 39.07
See application file for complete search history.

(56) References Cited

U.S. PATENT DOCUMENTS

| | | | |
|---|---|---|---|
| 3,651,645 A | 3/1972 | Grieb | |
| 4,825,643 A | 5/1989 | Hennecke et al. | |
| 5,555,721 A | 9/1996 | Bourneuf et al. | |

FOREIGN PATENT DOCUMENTS

BE  467 445  9/1946

OTHER PUBLICATIONS

U.S. Appl. No. 11/778,928, filed Jul. 17, 2007, Argaud, et al.
U.S. Appl. No. 11/779,016, filed Jul. 17, 2007, Argaud, et al.
U.S. Appl. No. 11/780,287, filed Jul. 19, 2007, Brunet, et al.
U.S. Appl. No. 11/780,225, filed Jul. 19, 2007, Brunet, et al.

*Primary Examiner* — Edward Look
*Assistant Examiner* — Dwayne J White
(74) *Attorney, Agent, or Firm* — Oblon, Spivak, McClelland, Maier & Neustadt, L.L.P.

(57) ABSTRACT

System for cooling a downstream cavity of a centrifugal compressor impeller in a turbomachine, this compressor being connected to a diffuser comprising a downstream annular flange, an annular plating being mounted coaxially around the flange of the diffuser and substantially extending over the entire axial dimension of the flange so as to define an annular ventilation passage fed with air which is cooler than the air exiting the centrifugal compressor.

11 Claims, 1 Drawing Sheet

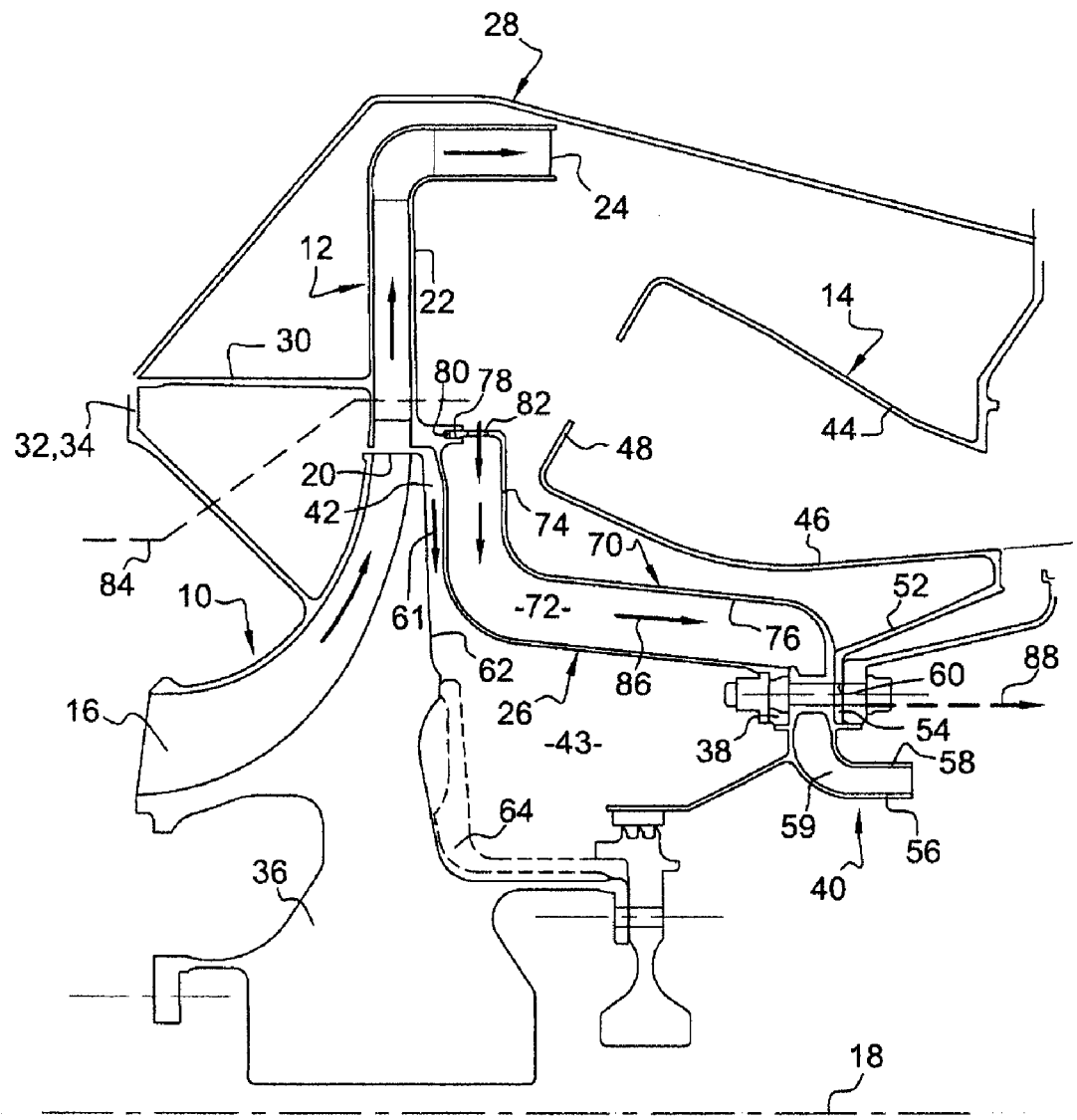
Single figure

SYSTEM FOR COOLING A DOWNSTREAM CAVITY OF A CENTRIFUGAL COMPRESSOR IMPELLER

BACKGROUND OF THE INVENTION

The present invention relates to a system for cooling a downstream cavity of a centrifugal compressor impeller in a turbomachine such as in particular a turbojet, an airplane turboprop or a gas generator.

The cavity which is formed downstream of the rotor or impeller of a centrifugal compressor in a turbomachine must be ventilated to discharge the thermal energy afforded by the impeller. This ventilation is generally done by bleeding off air at the outlet of the compressor, at the junction with the inlet of an annular diffuser which feeds a combustion chamber.

However, as this ventilation air is bled off at the outlet of the compressor, its temperature is already relatively high. It is further increased by viscous friction on the downstream face of the impeller, so that this face may be raised to a high temperature capable of attaining and exceeding the maximum temperature allowed by the material of the impeller, with a risk of deterioration of the impeller.

DESCRIPTION OF THE PRIOR ART

It has been proposed that an annular thermal protection shield be mounted on the downstream face of the impeller. However, this shield is unwieldy and gives rise to an increase in the mass of the turbomachine and the rotational inertia of the impeller of the compressor and may decrease the performance of the turbomachine.

SUMMARY OF THE INVENTION

The invention is in particular aimed at affording a simple, effective and economic solution to these problems.

It proposes for this purpose a system for cooling a downstream cavity of a centrifugal compressor impeller in a turbomachine, this compressor being connected at the outlet to a diffuser comprising an annular flange which extends downstream and along the impeller of the compressor and delimits an annular cavity downstream of the impeller ventilated by air bleed-off at the outlet of the compressor, wherein an annular plating is mounted coaxially around the flange of the diffuser and delimits with the flange an annular passage fed with air at a lower temperature than that of the air exiting the centrifugal compressor.

The cool air which circulates in the passage formed between the annular plating and the flange of the diffuser ensures the cooling and ventilation of this flange which can thus absorb a major part of the heat generated by the shearing of the air between the impeller of the compressor and the flange of the diffuser.

The air ventilating the downstream cavity of the impeller remains relatively cool and can cool the impeller of the compressor effectively, without requiring any thermal protection shield. The flowrate of air bled off at the outlet of the compressor for feeding the downstream cavity of the impeller and the ventilation of the impeller of the compressor can be decreased so as to increase the feed air flowrate for the diffuser and the combustion chamber and to improve the performance of the turbomachine.

It has been noted, in an exemplary embodiment, that feeding the annular passage with air bled off from the second stage of the compressor makes it possible to reduce the temperature of the impeller of the compressor by about 50 to 60° C.

In a preferred embodiment of the invention, the annular plating is substantially parallel to the flange of the diffuser, the annular plating and the flange each having a substantially L-shape in axial section.

The annular plating and the flange of the diffuser can be fixed at their downstream ends to means for injecting cooling air and/or for ventilating components situated downstream of the combustion chamber.

To facilitate its assembly, the plating can comprise at its upstream end a centered cylindrical edge supported by a cylindrical rim of the diffuser.

The annular passage between the plating and the flange of the diffuser is connected upstream to means for bleeding off air from an upstream stage of an axial compressor or at the outlet of a cooling heat exchanger. This passage is also connected downstream to a duct for discharging the ventilation air, which is at a lower pressure than that of the air exiting the diffuser.

The annular plating is advantageously made of a material with low thermal conductivity or comprises a cladding of material with low thermal conductivity.

The invention further relates to a turbomachine, such as a turbojet or an airplane turboprop, which comprises a cooling system such as described above.

BRIEF DESCRIPTION OF THE DRAWING

The invention will be better understood and other details, characteristics and advantages of the present invention will appear on reading the following description given by way of nonlimiting example and with reference to the appended drawing which is a diagrammatic partial half-view in axial section of a cooling system according to the invention.

DESCRIPTION OF THE PREFERRED EMBODIMENTS

The single FIGURE represents a part of a turbomachine such as a turbojet or an airplane turboprop, comprising from upstream to downstream, in the sense in which the gases flow inside the turbomachine, a centrifugal compressor stage 10, a diffuser 12 and a combustion chamber 14.

The inlet 16 of the centrifugal stage 10 is oriented upstream, substantially parallel to the axis 18 of the turbomachine, and its outlet 20 is oriented outwards, substantially perpendicularly to the axis 18, and is aligned with a radial inlet 22 of the diffuser 12. This diffuser is of annular shape bent at 900 and comprises an annular outlet 24 which is oriented parallel to the axis of the turbomachine and which emerges radially outside the inlet of the combustion chamber 14.

The diffuser 12 is supported by an outer casing 28 of the turbomachine which externally surrounds the compressor 10, the diffuser 12 and the combustion chamber 14. The diffuser 12 comprises a cylindrical shroud 30 which extends upstream from the inlet 22 of the diffuser and terminates at its upstream end in an annular collar 32 fixed by appropriate means of the screw-nut type to a collar 34 of the outer casing 28.

The diffuser 12 also comprises a downstream annular flange 26 with substantially L-section of which an upstream part is substantially radial and is linked at its radially outer end to the inlet 22 of the diffuser, and of which a downstream part is substantially cylindrical and terminates at its downstream end in an annular collar 38 for fixing to means 40 for injecting air for ventilating components (in particular turbine components) situated downstream of the combustion chamber 14.

The radial part of the flange 26 of the diffuser extends downstream of the rotor or impeller 36 of the centrifugal compressor stage, along and at a small distance from the latter so as to form a radial annular space 42 communicating at its radially outer end with the outlet 20 of the compressor stage, and at its radially inner end with an annular cavity 43 delimited by the cylindrical downstream part of the flange 26.

The combustion chamber 14 comprises two coaxial axisymmetric walls 44, 46 extending one inside the other and linked at their upstream ends to a chamber bottom wall 48. The radially outer wall 44 of the chamber is fixed at its downstream end to the outer casing 28, and its radially inner wall 46 is linked at its downstream end to a tapering ferrule 52 which comprises at its radially inner end an inner annular collar 54 for fixing to the aforesaid injection means 40.

The injection means 40 comprise two axisymmetric walls, inner 56 and outer 58, with substantially L-section which are mounted one inside the other and define between them an annular duct 59 bent to a right angle which emerges at its upstream end radially outwards and at its downstream end axially downstream. The annular duct 59 is fed with air exiting the diffuser 12.

The collar 38 of the flange 26 of the diffuser is applied to an upstream radial face of the inner wall 56 of the injection means 40, upstream of their inlet, and the collar 54 of the ferrule 52 is applied to a downstream radial face of the outer wall 58 of the means 40, downstream of their inlet. Orifices 60 are formed on the collars 38 and 54 for passing fixing means of the screw-nut type which extend through corresponding orifices of the walls 56, 58 of the injection means 40.

A small part of the air flowrate exiting the compressor stage 10 enters the radial space 42 delimited by the downstream face 62 of the impeller 36 and the flange 26 of the diffuser. This air (arrow 61) is subjected to significant shearing forces caused by the rotation of the impeller 36 in proximity to the radial part of the flange, thereby generating heat and giving rise to heating of the impeller which has limited thermal resilience.

In the current art, the solution consists in mounting an annular shield 64 (represented dashed) on the downstream face of the impeller 36 of the compressor to thermally protect the impeller from the heat and prevent it reaching significant temperatures while operational.

The system according to the invention makes it possible to do away with this shield, by virtue of an annular plating 70 mounted radially between the combustion chamber 14 and the flange 26 of the diffuser and delimiting with the latter an annular passage 72 fed with air which is cooler than the air exiting the compressor 10.

In the example represented, the plating 70 has a substantially L-section and comprises a radial upstream part 74 extending downstream and at some distance from the upstream radial part of the flange 26, substantially parallel to the latter part, and a substantially cylindrical downstream part 76 extending outwards and at some distance from the downstream cylindrical part of the flange 26, substantially parallel to the latter part.

The radial part 74 of the plating comprises at its radially outer end a cylindrical rim 78 oriented upstream which is engaged from downstream in an annular groove 80 emerging downstream and formed at the radially inner end of the inlet 22 of the diffuser. The rim 78 of the plating 70 comprises at least one radial orifice 82 for feeding cool air to the annular passage 72. This orifice 82 is connected by a feed duct (schematically represented dashed 84) to means for bleeding off air from an upstream stage of an axial compressor (not represented) situated upstream of the centrifugal stage 10, or to the outlet of a first circuit of a cooling heat exchanger which comprises in a known manner a second circuit in which a cooling fluid circulates.

The cylindrical wall 76 of the plating is fixed by welding at its downstream end to the injection means 40, for example and as represented, to the radially outer end of the outer wall 58 of the injection means 40.

The air 86 which flows in the passage 72 makes it possible to ventilate and to cool the flange 26 of the diffuser so that the latter can absorb the major part of the heat generated by the shearing of the air between the impeller 36 of the compressor and the radial part of the flange 26, and in this way limits the heating of the rotor and the occurrence of a temperature gradient along the downstream face 62 of the impeller of the compressor. This air 86 is thereafter discharged through at least one duct (schematically represented dashed 88) connected to the downstream end of the annular passage 72, for ventilating other components of the turbomachine.

The adjustment of the distance between the plating 70 and the flange 26 of the diffuser makes it possible to control the ventilation of the flange 26 and therefore the coefficient of heat exchange between the flange and the air 61 circulating in the space 42 and the cavity 43, and the coefficient of heat exchange between the flange and the air 86 circulating in the cavity 72. For a given flowrate of feed air to the passage 72, the smaller the distance between the plating 70 and the flange 26, the higher is the speed of the air 86 in the passage 72 and the more significant are the coefficient of heat exchange between this air and the flange and the coefficient of heat exchange between the flange 26 and the air 61 flowing between the impeller 36 and the flange 26.

The plating 70 is mounted leaktightly on the diffuser 12 and the injection means 40 thereby making it possible to feed the passage 72 with air at a different pressure from that of the air circulating between the plating 70 and the combustion chamber 14 and in the annular cavity 43.

The annular plating 70 is mounted in the turbomachine in the following manner:

After the diffuser 12 has been mounted on the centrifugal compressor 10 and before the injection means 40 and the combustion chamber 14 have been assembled on the flange 26 of the diffuser, the plating 70 is brought upstream and its rim 78 is fitted into the groove 80 of the diffuser 12. The injection means 40 are assembled on the collar 38 of the flange of the diffuser, then the radially outer end of the wall 58 of the injection means 40 and the downstream end of the plating 70 are spot welded together or welded with an annular weld bead. The chamber is thereafter shifted upstream and fixed by the ferrule 52 on the injection means 40.

The plating 70 and possibly the feed duct 84 and discharge duct 88 for the passage 72 are preferably made of a material with low thermal conductivity or comprise a cladding of material with low thermal conductivity.

The invention claimed is:

1. A system for cooling a downstream cavity of a centrifugal compressor impeller in a turbomachine, comprising:
a diffuser connected to an outlet of the compressor, the diffuser including an annular flange which extends downstream and along the centrifugal compressor impeller and delimits an annular cavity downstream of the centrifugal compressor impeller ventilated by air bled-off at the outlet of the centrifugal compressor,
wherein an annular plating is mounted coaxially around the annular flange of the diffuser and delimits with the annular flange an annular passage fed with air at a lower temperature than that of the air exiting the centrifugal compressor.

2. The system as claimed in claim 1, wherein the annular plating extends substantially parallel to the annular flange of the diffuser.

3. The system as claimed in claim 1 or 2, wherein the annular plating and the annular flange of the diffuser each have a substantially L-shape in axial section.

4. The system as claimed in claim 1, wherein the annular plating and the annular flange of the diffuser are fixed at their downstream ends to a ventilation air injection unit.

5. The system as claimed in claim 1, wherein the annular plating includes at its upstream end a centered cylindrical edge supported by a cylindrical rim of the diffuser.

6. The system as claimed in claim 1, wherein the annular passage is connected upstream to an air bleed from an upstream stage of an axial compressor or at an outlet of a cooling heat exchanger.

7. The system as claimed in claim 1, wherein the annular plating is mounted leaktightly on the annular flange of the diffuser.

8. The system as claimed in claim 1, wherein the annular plating is made of a material with low thermal conductivity.

9. The system as claimed in claim 1, wherein the annular plating includes a cladding of material with low thermal conductivity.

10. The system as claimed in claim 1, wherein the annular passage is connected downstream to a ventilation air discharge duct.

11. A turbomachine, which includes a cooling system according to claim 1.

* * * * *